SAYLER & BAIR
Fire Box for Forges.
No. 68,657.
Patented Sept. 10, 1867.
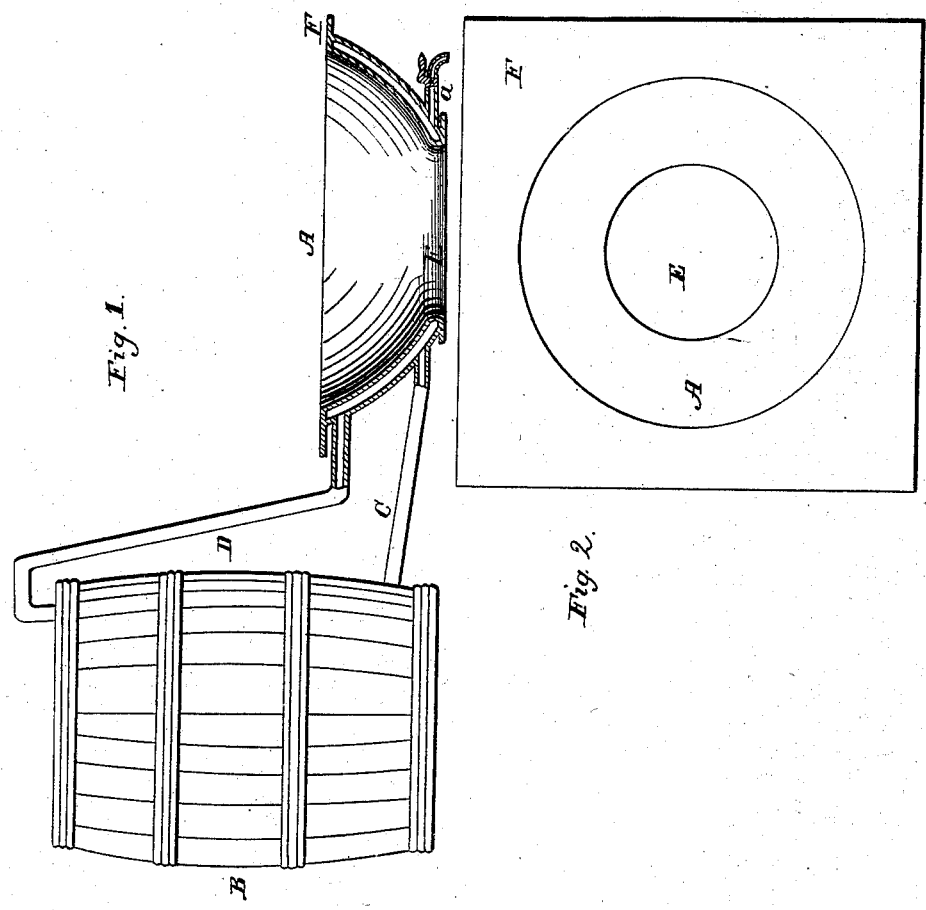

United States Patent Office.

HENRY SAYLER AND JEREMIAH BAIR, OF ST. PARIS, OHIO.

Letters Patent No. 68,657, dated September 10, 1867.

---

IMPROVED FIRE-BOX FOR FORGES.

---

The Schedule referred to in these Letters Patent and making part of the same.

---

TO ALL WHOM IT MAY CONCERN:

Be it known that we, HENRY SAYLER and JEREMIAH BAIR, of St. Paris, Champaign county, and State of Ohio, have invented a new and useful improvement in Fire-Pan for Forges; and we do hereby declare that the following is a full and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Figure 1 is a side elevation, with a portion shown in section.

Figure 2 is a top plan view of the pan.

Our invention has for its object the prevention of clinkers adhering to the walls of the fire-pan.

We construct the pan A of cast iron, and make it with double walls, as shown in fig. 1. In casting this pan it may be most expedient to cast the inner and outer walls separately, and then fit and bolt them securely together; or it may be made by casting the two shells in one piece, united at the bottom, and then bolt the flange F fast to the two walls, at the top, the prime object being to form the pan A, with a space for the circulation of water therein, in direct contact with the plate next the fire. Having thus formed the pan, we connect it with a reservoir of any suitable kind, which, in this case, is represented by a cask, B—by two pipes C and D, as shown in fig. 1. The bottom of the pan A is left open at the centre, as represented by E in fig. 2, so as to permit it to be set over a blast of any suitable or desired style, the air from the bellows entering from below through this opening. The fire is placed within the pan, and as soon as the water between the walls becomes heated it begins to ascend through the tube D, while its place is supplied by cold water from the reservoir B through tube C. In this way the pan is kept from becoming heated to any great extent, and the clinker is thereby prevented from adhering to the walls of the pan, thus avoiding the necessity of removing the pan and substituting a new one, or of spending time and labor in the effort to clean it. A pipe, a, provided with a cock, is attached to one side at the bottom, as shown in fig. 1, for the purpose of drawing off the water from the pan whenever desired.

Having thus described our invention, what we claim, is—

1. The fire-pan A, having the double walls, and otherwise constructed, as herein shown and described.

2. In combination with the pan A, made as described, we claim the pipes C and D, connecting it with the reservoir B, when arranged to operate as set forth.

HENRY SAYLER,
JEREMIAH BAIR.

Witnesses:
SAM'L T. MCMORRAN,
LEWIS R. SAYLER.